No. 709,751. Patented Sept. 23, 1902.
D. W. DAVIS.
PROCESS OF PRESERVING FROZEN FOOD PRODUCTS.
(Application filed May 21, 1902.)
(No Model.)
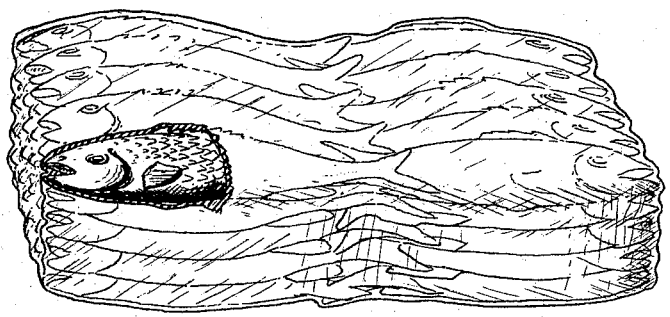
Witnesses.
Robert Everitt,
Vinton Coombs.
Inventor.
David W. Davis.
By W. H. Ruff
Atty.

UNITED STATES PATENT OFFICE.

DAVID W. DAVIS, OF DETROIT, MICHIGAN, ASSIGNOR TO SIDNEY R. DIXON, TRUSTEE, OF DETROIT, MICHIGAN.

PROCESS OF PRESERVING FROZEN FOOD PRODUCTS.

SPECIFICATION forming part of Letters Patent No. 709,751, dated September 23, 1902.

Application filed May 21, 1902. Serial No. 108,318. (No specimens.)

*To all whom it may concern:*

Be it known that I, DAVID W. DAVIS, a citizen of the United States, residing at Detroit, Wayne county, Michigan, have invented certain new and useful Improvements in Processes of Preserving Frozen Animal-Food Products, of which the following is a specification.

This invention relates to an improved process of preserving fish and other animal-food products in their fresh condition, and has for its object to provide a novel process of preserving food products of the character described in their fresh and natural condition for an indefinite period of time by simple, inexpensive, and convenient means. To these ends my invention consists in the improved process hereinafter described, and particularly pointed out in the claim following the description, reference being had to the accompanying drawing, forming a part of this specification, wherein is illustrated a perspective view of a cake of fish treated in accordance with my invention.

In describing my improved process I will explain the same as applied to the preservation of fish; but I wish it to be distinctively understood that the process may be successfully employed in the preservation of fresh animal-food products of every kind whatsoever.

In carrying my process into effect in preserving fish I proceed as follows: The fish are taken in their fresh condition and are placed tail to tail in a freezing-pan—such, for example, as was patented to me on the 12th day of December, 1875, No. 161,596. In practice the fish are preferably disposed in the manner illustrated in the drawing to form what is known in the art as a "cake," and the pan is packed in fine ice and salt to subject the fish to a temperature of nearly zero Fahrenheit. The cake inclosed in the pan is left remaining in the freezing mixture until all the fish constituting the cake have been thoroughly frozen, the length of time being dependent on the size of the cake. The cake of fish after having been thoroughly frozen in the manner described is removed from the pan and while still in a frozen condition is immersed in a body of water of the temperature of 32° Fahrenheit and held submerged therein for about four or five minutes or until a film of ice is caused to form about the previously-frozen cake varying in thickness from one-sixteenth to three thirty-seconds of an inch. The cakes thus prepared are finally placed in cold storage, where the temperature is continuously maintained below the freezing-point, and are kept in cold storage until ready for sale or use.

The important features of my improved process are as follows: The fish must first be frozen to a temperature of several degrees Fahrenheit below freezing-point, preferably to nearly zero. Then while still in a frozen condition they are to be immersed and held submerged for several minutes in a body of water which absolutely must be at a temperature of 32° Fahrenheit. Finally the fish thus prepared are to be placed in cold storage, which must be continuously maintained at a temperature below freezing-point. The fish having been first reduced to a very low temperature readily take on the film of ice when submerged in the water that has previously been reduced to a temperature of near freezing-point, and this film of ice acts as a hermetically-sealed envelop that effectually excludes the air, and thereby prevents deterioration of the fish either as edible articles of food or their commercial value owing to their appearance. After having been thus treated the fish are in readiness to be placed in cold storage, where they may be preserved for an indefinite period of time in their perfectly fresh and natural condition, retaining all their natural flavor, juices, texture, and appearance and in every way fully as desirable as when freshly caught. By submerging the fish after having first been frozen to a low temperature in water that has been reduced to freezing-point the film of ice is formed about the fish without extracting any of the frost from the fish.

I have described my improved process as applied to preserving fish; but it will be manifest that it may be with equal success employed for the preservation of other fresh animal foodstuffs—such as game, poultry, and meats—and it will also be equally apparent that instead of freezing the fish in pans or in cakes they may be frozen by any suitable means or while disposed in any desired manner.

I do not pretend to be the first to incase fish and other food products in ice to preserve the same, and make no broad claim to such method of treating food products.

Having described my invention, what I claim is—

The herein-described process of preserving fresh animal-food products, consisting in first freezing the products to a temperature below freezing-point, then immersing the said products while in a frozen condition in water having a temperature of 32° Fahrenheit to form an inclosing shell of ice about the products to thoroughly exclude the air therefrom without extracting the frost from the products, and finally storing the products thus prepared without further treatment in a temperature below freezing-point, substantially as and for the purpose specified.

In testimony whereof I have hereunto set my hand in presence of two subscribing witnesses.

DAVID W. DAVIS.

Witnesses:
VINTON COOMBS,
F. A. SEBRING.